May 27, 1941.  P. VAN RIEL  2,243,366
CENTRIFUGAL MACHINE
Filed Sept. 21, 1937
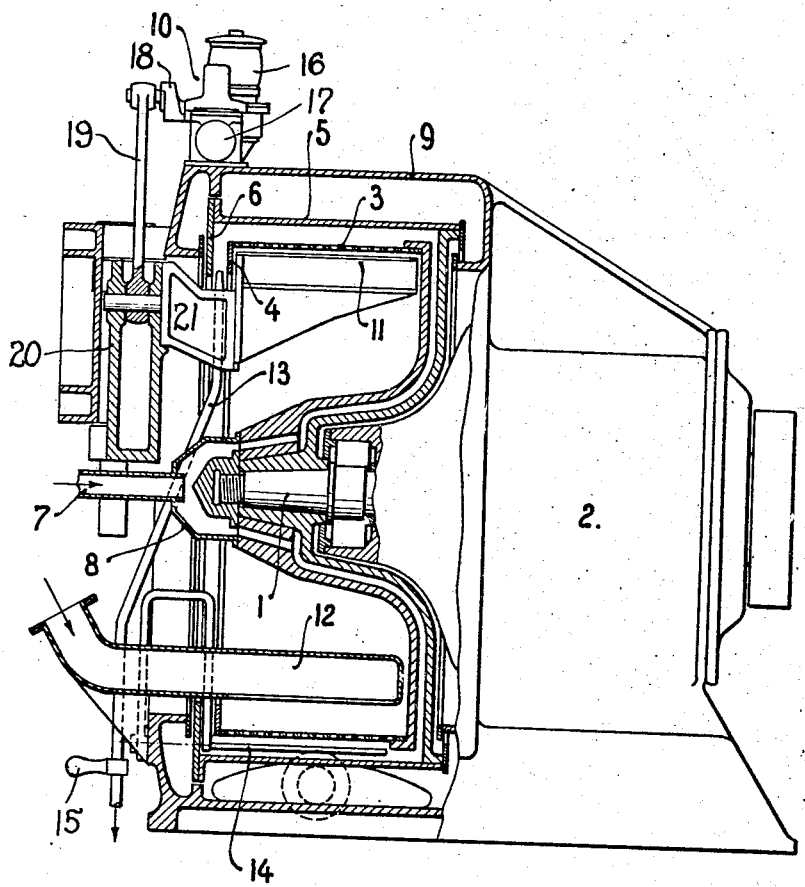
Inventor
Pieter van Riel
by [signature]
Atty.

Patented May 27, 1941

2,243,366

UNITED STATES PATENT OFFICE 2,243,366

CENTRIFUGAL MACHINE

Pieter van Riel, Delft, Netherlands, assignor to N. V. Machinefabriek "Reineveld," Delft, Netherlands, a company of the Netherlands Application September 21, 1937, Serial No. 164,934
In Germany September 25, 1936

6 Claims. (Cl. 210—67)

This invention relates to a centrifugal machine provided with a perforated basket and adapted not only for separating solids and liquids from one another, but also for washing, impregnating or otherwise treating the solid material remaining in the basket after the liquid material has been extracted.

In order that the invention may be well understood by those skilled in the art, the same will now be described in further detail with reference to the annexed drawing, which illustrates an axial sectional view of an embodiment thereof.

The horizontal shaft 1 of the driving motor 2 carries the ordinary open, perforated basket 3 provided along its outer edge with an inwardly projecting annular strip 4. The hub portion of this basket is supported by the hub of a second, impervious basket 5, which is directly secured to the shaft 1 and surrounds the basket 3, from which it is suitably spaced. As shown, the basket 5 is also provided along its outer edge with an annular strip 6, which projects inwardly through a somewhat greater distance than does the strip 4.

In alignment with the shaft 1 there is provided a pipe 7 for supplying the liquor employed for washing or otherwise treating the solid material remaining in the basket 3. Through a hood 8 and suitable passages in the hub of basket 5, said pipe communicates with the interspace of both baskets.

The basket 5 is enclosed by a casing 9, which forms part of the motor casing and carries the ordinary mechanism 10, by means of which a scraper 11 for emptying the basket 3 is adapted to be reciprocated in a substantially radial direction. The reciprocating mechanism includes a motor 16 designed to operate an overhung crank 18 through a suitable reduction gear 17. This crank reciprocates a connecting rod 19, the lower end of which is guided by a crosshead 20 and is connected to the scraper 11 by a bracket 21. Through a pipe 12 the basket 3 can be supplied with the material to be treated.

Opening into the space between the annular strips 4 and 6 is a discharge pipe 13 arranged for radial reciprocation by means of a hand lever or a handle 15.

Finally, the machine is provided with a substantially flat scraper 14 in the space between the cylindrical walls of the baskets 3 and 5, said scraper being mounted for rotation about an axis in parallel relation with the shaft 1 and adapted, through a crank handle not shown, to be turned about said axis. By means of said crank handle the scraper 14 can be moved either into a position wherein it is substantially parallel with the cylindrical walls of both baskets, or into an inclined position wherein it can loosen any solid material that may have accumulated on the inner wall of the basket 5.

Assuming, by way of example, that the described machine is to be used in the manufacture of maize starch, which is practically free from soluble proteins, the modus operandi is as follows:

The starch liquor, from which the insoluble proteins have been removed, for instance by hydrochloric acid, is fed through the pipe 12 into the rapidly revolving basket 3, it being understood that the drain pipe 13 assumes its outer position, wherein its mouth is located close to the inner side of the cylindrical wall of basket 5. The starch liquor is thus thrown rapidly outwards against the perforated wall of said basket, so that the juice is extracted therefrom and is projected to the impervious wall of basket 5 whence it is discharged by drain pipe 13.

After some time, the supply of starch liquor is cut off, and when the extraction of juice from the material in basket 3 is finished, the drain pipe 13 is retracted and fresh water is introduced through pipe 7 and hood 8 into the interspace of both baskets. Thereby, the layer of starch accumulated on the perforated wall of basket 3 is impregnated with water entering from outside through the perforated wall, and may even be flooded. Thereupon, the water supply is cut off and the centrifugal apparatus allowed to continue its revolving movement until the proteins still present in the starch are completely dissolved. Finally, the pipe 13 is again moved outwards, whereby the water and the proteins dissolved therein are drained, and the practically dry starch is removed from basket 3 by means of the scraper 11. If necessary, the washing operation may be repeated before the starch is removed.

In view of the above explanation it is not necessary to describe the manner in which the novel centrifugal machine can be used for nitrating cotton, for regenerating catalysts, etc.

It will be understood that the described machine can be constructed with its axis vertical, and that it can be fully enclosed, without departing from the spirit and the scope of the present invention.

What I claim is:

1. In a centrifugal machine, a motor, a shaft therefor, an imperforate cylinder, a perforated basket having a hub portion mounted on the hub of the cylinder, the wall of the cylinder and basket being spaced to provide an inlet passage, an inlet pipe substantially in line with the shaft, a hood communicating with the delivery end of the pipe and open to said space to deliver material within the cylinder and exteriorly of the basket, and a drain pipe movable to and from the space between the cylinder and basket, said drain pipe when within the space forming an operative drain from said space through the pipe, said pipe when beyond the space preventing such drain.

2. In a centrifugal machine, a motor, a shaft therefor, an imperforate cylinder, a perforated basket having a hub portion mounted on the hub of the cylinder, the wall of the cylinder and basket being spaced to provide an inlet passage, an inlet pipe substantially in line with the shaft, a hood communicating with the delivery end of the pipe and open to said space to deliver material within the cylinder and exteriorly of the basket, a scraper arranged in the space between the cylinder and basket, and means for moving the scraper into and out of cooperative relation with the interior surface of the wall of the cylinder.

3. In a centrifugal machine, a perforated substantially cylindrical basket mounted for rapid rotation about its axis and provided at one end with an inwardly extending annular flange, an imperforate cylinder secured to and surrounding said perforated basket but suitably spaced therefrom, said cylinder being provided at the end adjacent to the flanged end of the perforated basket with an annular flange axially spaced from and extending inwardly through some distance beyond the flange of said perforated basket, means for supplying material to be treated into said perforated basket, means for supplying treating liquor directly into the interspace of said baskets, and a drain pipe for removing liquid from said interspace, said drain pipe opening into the space between said annular flanges and means for substantially radially adjusting the drain pipe into and out of said interspace.

4. In a centrifugal machine, a motor, a shaft therefor, an imperforate cylinder having an inwardly extending annular flange at one end thereof and provided in addition to a hub portion secured to said shaft with a radially extending wall connecting said hub with the end of the cylinder remote from said annular flange, a perforated cylindrical basket coaxially mounted within said imperforate cylinder but suitably spaced therefrom and having at its end adjacent to the flanged end of said cylinder an annular flange axially spaced from and extending inwardly through a smaller distance than does the flange of the imperforate basket, said basket being provided in addition to a hub portion mounted on the hub of the cylinder with a radially extending wall interconnecting its hub portion with the end of said basket remote from said annular flange, said radially extending walls being spaced apart to provide a space communicating with the space between the cylinder and the basket, an inlet pipe for treating liquor in line with the shaft and communicating with the space between said radially extending walls, a second inlet pipe for supplying material to be treated into the basket, and a drain pipe for removing liquid from the space between the cylinder and the basket, said drain pipe opening into the space between said annular flanges and means for substantially radially adjusting the drain pipe into and out of said interspace.

5. In a centrifugal machine, a perforated substantially cylindrical basket mounted for rapid rotation about its axis and provided at one end with an inwardly extending annular flange, an imperforate cylinder secured to and surrounding said perforated basket but suitably spaced therefrom, said cylinder being provided at the end adjacent to the flanged end of the perforated basket with an annular flange axially spaced from and extending inwardly through some distance beyond the flange of said perforated basket, means for supplying material to be treated into said perforated basket, means for supplying treating liquor directly into the interspace of said baskets, a drain pipe for removing liquid from said interspace, said drain pipe opening into the space between said annular flanges and means for substantially radially adjusting the drain pipe into and out of said interspace, a scraper arranged in the space between the cylinder and the basket, and means for moving said scraper into and out of cooperative relation with the interior surface of the wall of the cylinder.

6. In a centrifugal machine, a motor, a shaft therefor, an imperforate cylinder having an inwardly extending annular flange at one end thereof and provided in addition to a hub portion secured to said shaft with a radially extending wall connecting said hub with the end of the cylinder remote from said annular flange, a perforated cylindrical basket coaxially mounted within said imperforate cylinder but suitably spaced therefrom and having at its end adjacent to the flanged end of said cylinder an annular flange axially spaced from and extending inwardly through a smaller distance than does the flange of the imperforate basket, said basket being provided in addition to a hub portion mounted on the hub of the cylinder with a radially extending wall interconnecting its hub portion with the end of said basket remote from said annular flange, said radially extending walls being spaced apart to provide a space communicating with the space between the cylinder and the basket, an inlet pipe for treating liquor in line with the shaft and communicating with the space between said radially extending walls, a second inlet pipe for supplying material to be treated into the basket, a drain pipe for removing liquid from the space between the cylinder and the basket, said drain pipe opening into the space between said annular flanges and means for substantially radially adjusting the drain pipe into and out of said interspace, a scraper arranged in the space between the cylinder and the basket, and means for moving said scraper into and out of cooperative relation with the interior surface of the wall of the cylinder.

PIETER van RIEL.